United States Patent [19]

Huggins et al.

[11] Patent Number: 4,928,008
[45] Date of Patent: May 22, 1990

[54] VARIABLE LIGHT TRANSMISSION FILTER AND OPTICAL ANALOG POSITION SENSOR

[75] Inventors: Raymond W. Huggins, Mercer Island, Wash.; Bruce Van Deventer, St. Louis, Mo.; Glen E. Miller, Redondo, Wash.

[73] Assignee: The Boeing Company, Seattle, Wash.

[21] Appl. No.: 131,664

[22] Filed: Dec. 11, 1987

[51] Int. Cl.$^5$ ............................................. G01D 5/34
[52] U.S. Cl. ............................ 250/231.1; 250/237 G; 250/211 K; 350/314; 356/373; 356/37.5
[58] Field of Search ............. 250/211 K, 229, 231 SE, 250/237 G, 237 R; 356/374; 350/314

[56] References Cited

U.S. PATENT DOCUMENTS

| | | | |
|---|---|---|---|
| 2,244,507 | 6/1941 | Thomas | 88/14 |
| 2,960,015 | 11/1960 | Rodine | 95/1 |
| 3,171,034 | 2/1965 | Tomasulo et al. | 250/211 K |
| 3,193,686 | 7/1965 | Heinz | 250/211 K |
| 3,193,687 | 7/1965 | Hatcher | 250/216 |
| 3,305,692 | 2/1967 | Girard | 250/237 G |
| 3,343,446 | 9/1967 | Girard | 88/14 |
| 3,755,681 | 8/1973 | Montross | 250/237 R |
| 3,892,961 | 7/1975 | Bachmann | 250/237 R |
| 4,062,628 | 12/1977 | Gale | 350/162 R |
| 4,103,155 | 7/1978 | Clark | 250/231 SE |
| 4,180,931 | 1/1980 | Osch | 250/211 K |
| 4,284,885 | 8/1981 | Swensen | 250/211 K |
| 4,547,813 | 10/1985 | McGraw et al. | 250/237 R |
| 4,549,808 | 10/1985 | Ernst | 356/374 |
| 4,554,451 | 11/1985 | Kirstein | 250/237 G |
| 4,600,835 | 7/1986 | Ishida et al. | 250/237 G |

Primary Examiner—David C. Nelms
Attorney, Agent, or Firm—Finnegan, Henderson, Farabow, Garrett & Dunner

[57] ABSTRACT

A light transmission filter for transmitting a beam of light of any wave length. The filter is made up of a pattern of opaque figures positioned along a transparent substrate. The spacing between figures is varied along the substrate so that the beam of light intercepted by the filter is variably transmitted as a selected function of the longitudinal position of the filter relative to the beam of light. The spacing of the figures along the substrate is selected to achieve a light transmission characteristic for the film in accordance with a desired mathematical function. An optical analog position sensor for sensing the position of a movable member along a prescribed path including the optical transmission filter attached to the movable member with the substrate having a longitudinal configuration corresponding to the prescribed path. The intensity of a fixed beam of light transmitted through the filter indicates the position of the member.

26 Claims, 14 Drawing Sheets

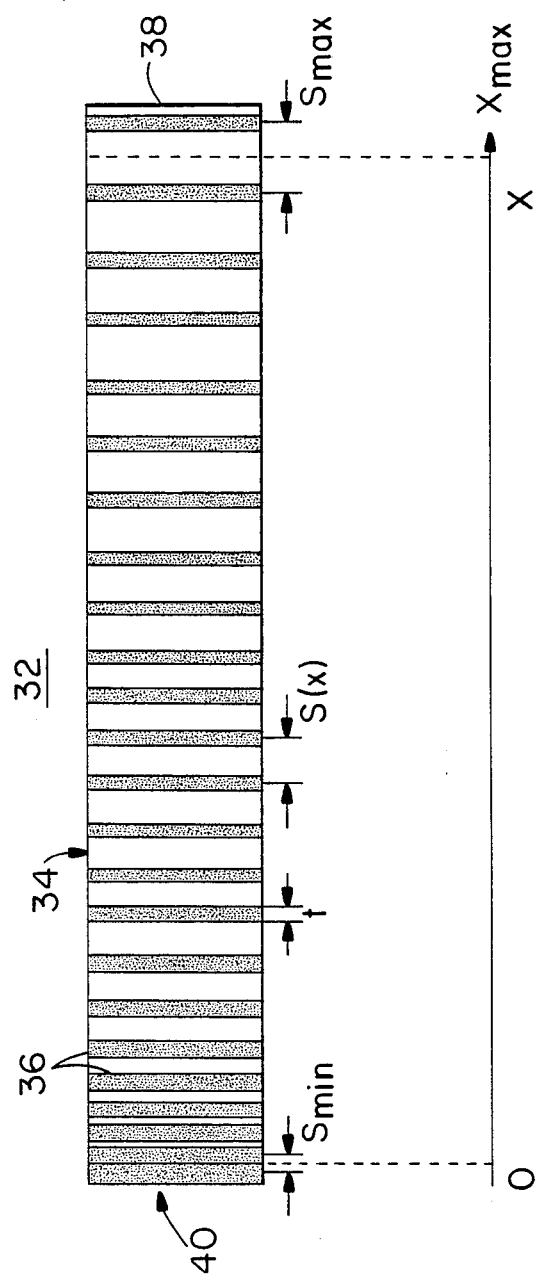

FIG. 5a
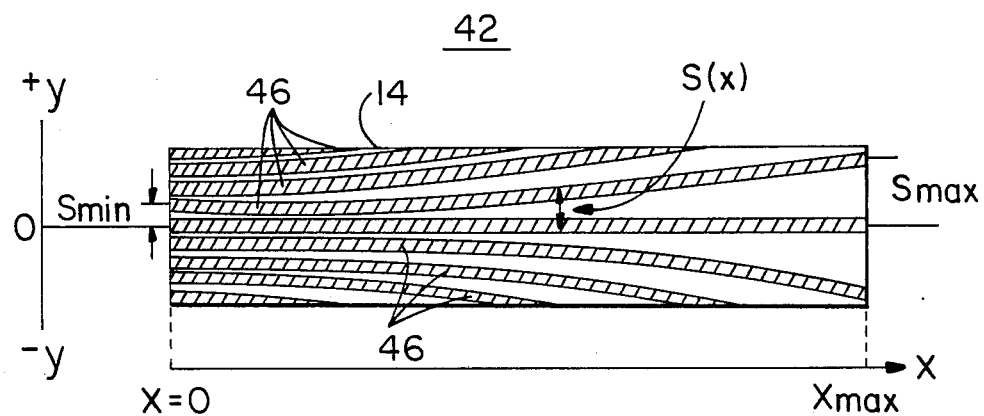
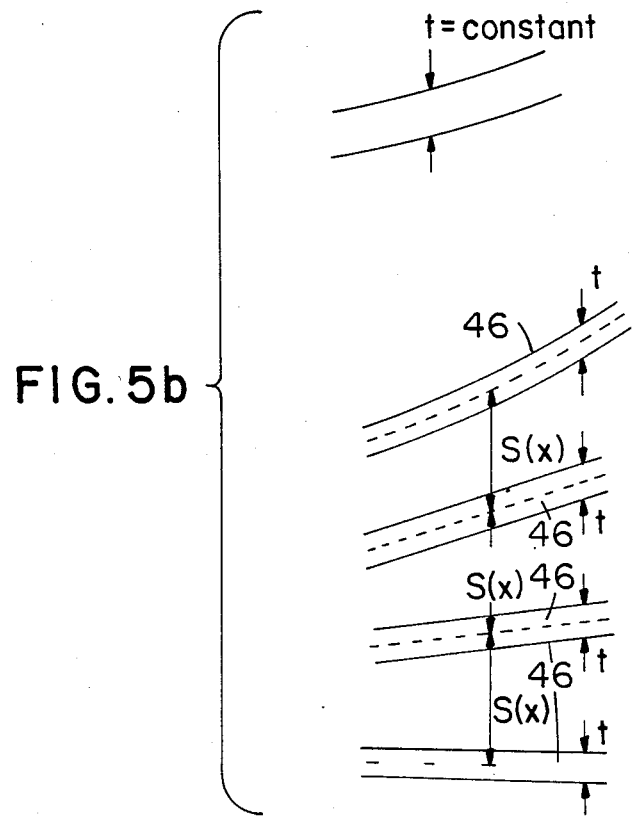
FIG. 5b

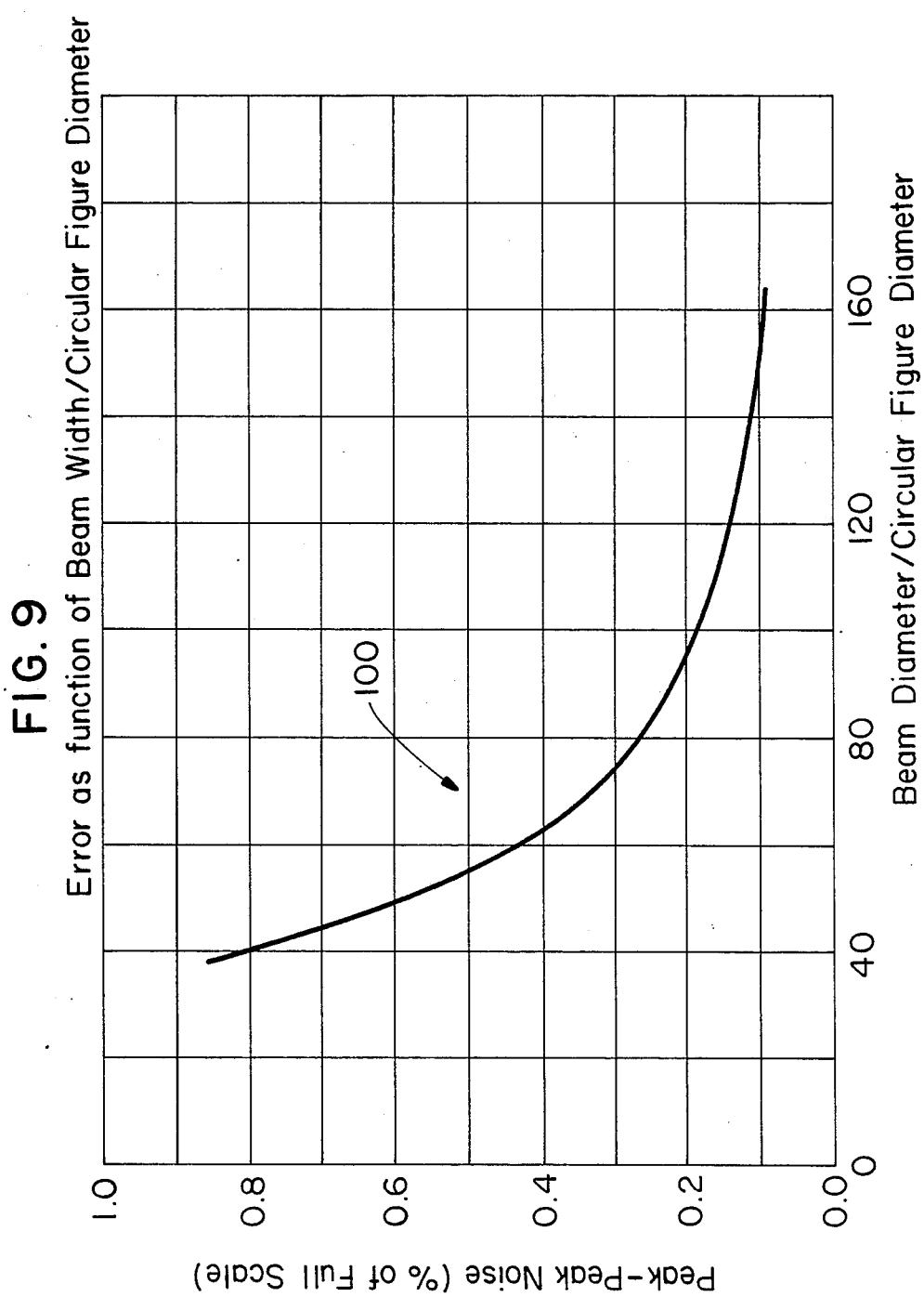

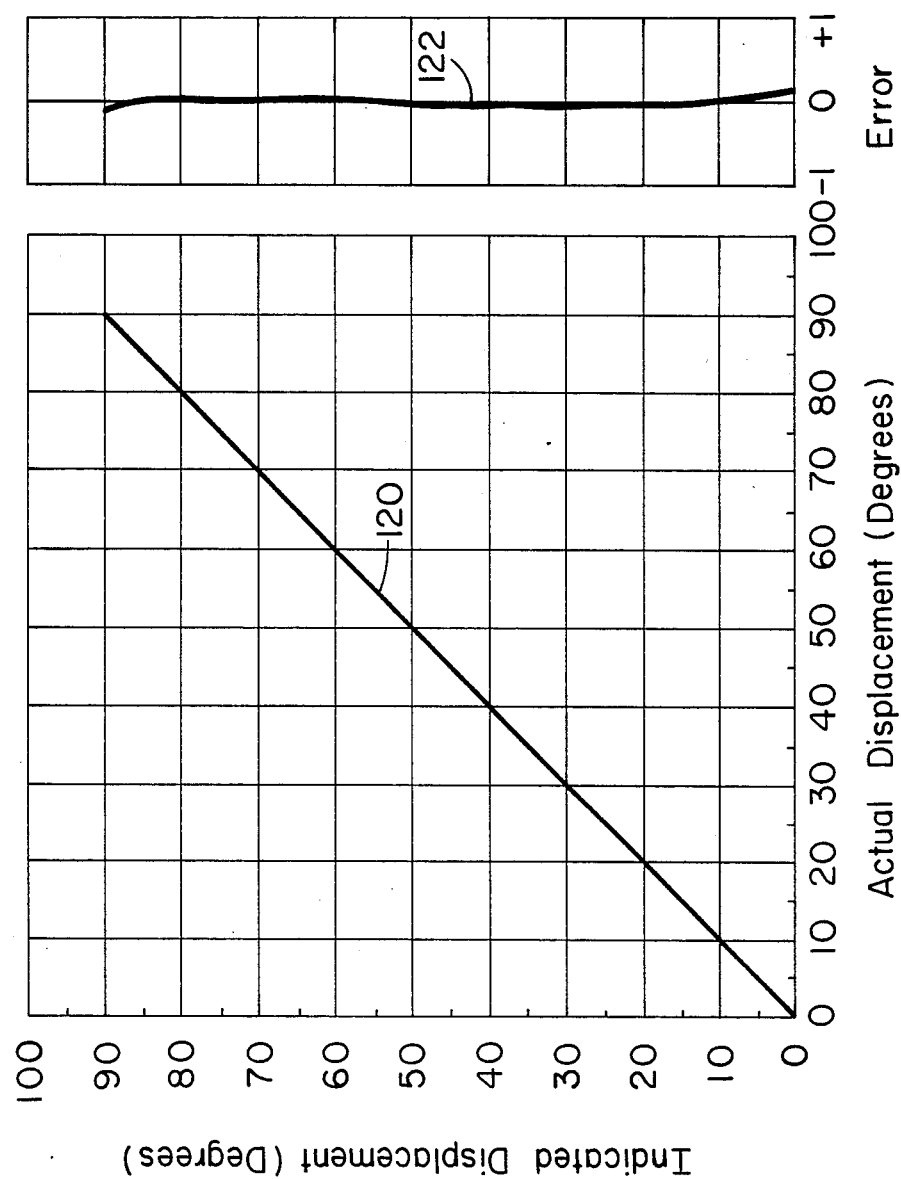

VARIABLE LIGHT TRANSMISSION FILTER AND OPTICAL ANALOG POSITION SENSOR

BACKGROUND OF THE INVENTION

The present invention relates to an apparatus and method for filtering a beam of light and more particularly to an improved light transmission filter suitable for use in an optical analog sensor for determining the position of a movable object in a prescribed path.

Several different types of variable light transmission filters have been proposed. One type of filter uses a thin reflective film sputtered on a transmissive substrate. The sputtered film has a variable thickness for attenuating a beam of light shining through the substrate as a function of the thickness of the film. In practice, the thickness of the film is difficult to control in order to achieve the desired linear accuracy, and, as a result, commercially available filters tend to have linearity errors approximating five percent.

Another known type of variable light transmission filter uses a wedge of glass having an inherent light absorbing property. The longer the path of light through the wedge, the greater the light is attenuated. This type filter requires that the surface of the glass wedge be ground to a particular shape to achieve a linear attenuation. For small ranges of light wavelengths, this glass wedge type device approaches linearity in transmission, but for many purposes the range of wavelengths encountered will be large, thereby destroying the linear characteristics.

A third type of variable light transmission filter utilizes a mask for variably reducing the size of an aperture to attenuate the transmission of light therethrough. Typically, a wedge-shaped mask is used to vary the size of a slit-shaped sensing aperture. This type of filter produces a highly linear attenuation of light provided there is uniform illumination across the slit. However, the center of a given aperture tends to be illuminated more than the edges. This difference in illumination reduces the linearity of attenuation, particularly when the transmitted light is of low density.

With thin film and glass wedge type filters where light is transmitted through media of varying thicknesses, it is difficult not only to obtain an accurate linear light transmission characteristic but also difficult to produce filters that vary according to trigonometric, exponential, logarithmic, or other selected functions.

An object of the present invention is to provide an improved light transmission filter that overcomes disadvantages of the type presently known.

Another object of the present invention is to provide an improved light transmission filter that provides linear transmission characteristics for a beam of light having a large range of wavelengths.

Another object is to provide an improved light transmission filter that is relatively simple in construction, inexpensive to manufacture, and can be manufactured so that each filter has virtually identical properties.

A further object is to provide an improved light transmission filter that is capable of providing a light transmission characteristic that varies in accordance with a selected algebraic function.

A still further object is to provide an improved optical analog sensor for determining the position of a movable member along a prescribed path.

Additional objects and advantages of the invention will be set forth in part in the description which follows, and in part will be obvious from the description, or may be learned by practice of the invention. The objects and advantages of the invention will be realized and attained by means of the instrumentalities and combinations particularly pointed out in the appended claims.

SUMMARY OF THE INVENTION

To achieve the objects of the invention, as embodied and broadly described herein, the light transmission filter of the present invention comprises a substrate having a selected configuration and having a first light transmission characteristic and a pattern of spaced figures having a second light transmission characteristic, disposed on the substrate, for intercepting a beam of light. The figures are selectively dimensioned, configured and spaced relative to at least one dimension of the substrate for providing an overall light transmission characteristic that varies in accordance with a selected mathematical function in a selected direction relative to at least one dimension of the substrate.

In another aspect of the invention, as also embodied and broadly described herein, an optical analog sensing device of the present invention is provided for determining the position of a movable member along a prescribed path and comprises a member mounted to move in a prescribed path, a substrate, a pattern of spaced figures disposed on the substrate having one dimension configured to correspond to the prescribed path and light transmitting characteristics differing from that of the substrate. The figures are selectively dimensioned, configured and spaced on the substrate for providing a light transmission characteristic that varies in accordance with a selected mathematical function in the direction of the one dimension of the pattern. Means are also provided for causing one of either the substrate or a beam of light directed at the substrate to move relative to the other throughout the prescribed path, and means for detecting the intensity of the filtered beam for determining the position of the movable member in the prescribed path.

The accompanying drawings, which are incorporated in and constitute a part of this specification, illustrate preferred embodiments of the invention and together with the detailed description of the preferred embodiments herein, serve to explain the principles of the invention.

BRIEF DESCRIPTION OF THE DRAWINGS

FIG. 4(a) is a schematic plan view illustrating rectangular figure positions in a light transmission filter having a rectilinear configuration, FIG. 5(a) is a schematic plan view illustrating hyperbolic figure positions of a light transmission filter for linear attenuation in accordance with the present invention, FIG. 5(b) is a detailed view of the hyperbolic figure portions of FIG. 5(a), FIG. 9 is a graph showing theoretical sensing apparatus error as a function of the light beam width/circular figure diameter ratio for a light transmission filter constructed in accordance with the present invention, FIG. 11 is a graph showing error by plotting actual angle of displacement vs. the sensing apparatus indicated angle of displacement for a position sensing apparatus according to one actual reduction to practice.

DESCRIPTION OF THE PREFERRED EMBODIMENTS

Figure 1:
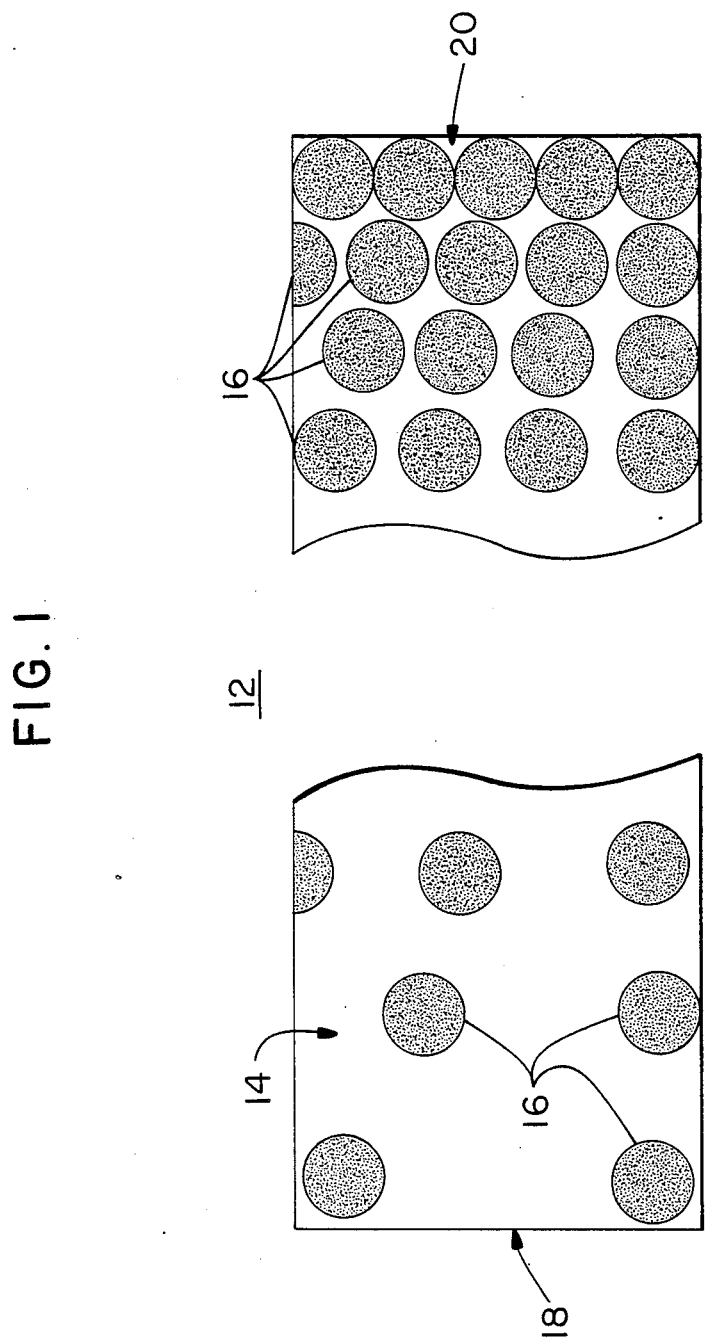
FIG. 1 is a plan view illustrating figure locations for circular figures in one embodiment of a light transmission filter constructed in accordance with the present invention.

Reference will now be made in detail to the present preferred embodiments of the invention, examples of which are illustrated in the accompanying drawings.

In accordance with the present invention, there is provided a light transmission filter comprising a substrate having a selected configuration and having a first light transmission characteristic, and a pattern of spaced figures disposed on the substrate having a second light transmission characteristic. As embodied in FIG. 1, filter 12 includes a substrate 14 with a pattern of spaced FIGS. 16 disposed on substrate 14 for intercepting a beam of light. FIGS. 16 have a light transmission characteristic different from that of substrate 14. Although in the present embodiment of the invention, FIGS. 16 are opaque to light and substrate 14 transparent, substrate 14 may be opaque and FIGS. 16 transparent, or either FIGS. 16 or substrate 14 may be reflective. FIGS. 16 or substrate 14 may transmit, reflect or be opaque to light of a single wavelength, light of a selected range of wavelengths or light of all wavelengths. One method of preparing the filter is to coat the substrate, such as 14, which may be made of transparent glass, with an opaque coating such as gold, nickel or chrome to form the figures such as 16. Photolithography can be used to manufacture filters 12 and is a relatively simple manufacturing technique.

In accordance with the invention, the figures are selectively dimensioned, configured and spaced throughout at least one dimension of the substrate for providing an overall light transmission characteristic that varies in accordance with a selected mathematical function in a selected direction relative to at least one dimension of the substrate. As embodied in FIG. 1, substrate 14 may be of rectilinear configuration with circular FIGS. 16, which are selectively dimensioned, configured and spaced through the longitudinal dimension of substrate 14 for providing a light transmission characteristic that varies in accordance with the position of an intercepted beam of light relative to substrate 14. At a first end 18 of substrate 14, figures 16 have a minimum density, i.e., the number of FIGS. 16 per unit area is a selected minimum value, and therefore a maximum amount of light is transmitted through the filter 12. At a second end 20 of substrate 14, FIGS. 16 have a maximum density; and therefore a minimum amount of light is transmitted through filter 12. In this embodiment, having circular FIGS. 16, the optical transmission throughout substrate 14 can be varied from nearly 1, representing zero figure density, to a number which only approaches 0; since the circular figures, even when most closely packed, obscure only about 75% of the light. It should be noted that if the figures are hexagonal, 100% of the light can be obscured.

The light transmission characteristic along substrate 14 varies continuously from a minimum transmission of light at second end 20 to a maximum transmission of light at first end 18, the transmission characteristic varying in accordance with a selected mathematical function in a selected direction relative to at least one dimension of substrate 14. In this embodiment, the light transmission characteristic varies as a linear function of the longitudinal direction along substrate 14. However, within the scope of the present invention, the light transmission characteristic may be made to vary in accordance with any selected function.

In accordance with the invention, the figure spacing may be constant with the figure size variable or the figure size may be constant with the figure spacing variable. In the embodiment illustrated in FIGS. 1 and 2, FIGS. 16 are circular in configuration, have a uniform size, and are variably spaced with the variable spacing determined as follows.

Figure 2:
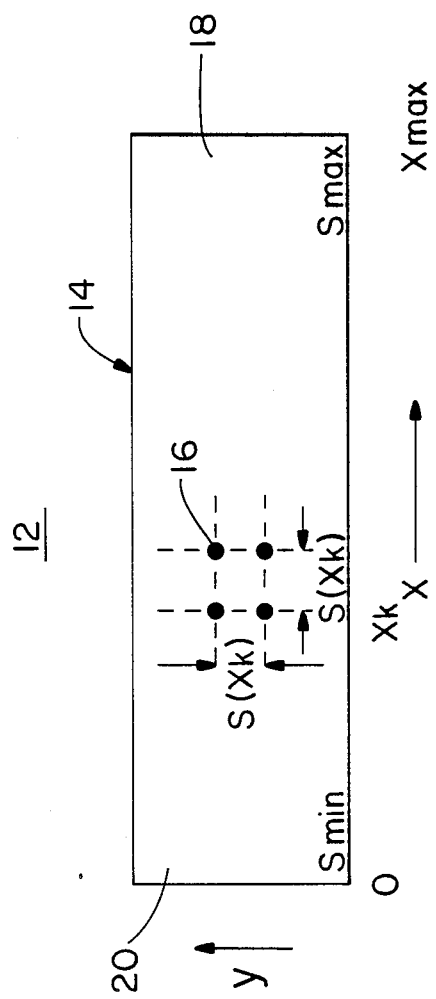
FIG. 2 is a schematic plan view illustrating figure spacing for circular figures in one embodiment of a light transmission filter in accordance with the present invention.

Referring to FIG. 2, $S_{min}$ is the circular figure spacing at the high density end 20 of substrate 14, and $S_{max}$ is the circular figure spacing at the low density end 18 of substrate 14. The spacing between circular FIGS. 16 in the X and Y directions is $$S(x_k) = \frac{b}{(a - x_k)^{\frac{1}{2}}} \qquad (1)$$

so that the x coordinate of the $(k+1)^{th}$ column is $$x(k+1) = x_k + S(x_k). \qquad (2)$$

The spacing between the circular figures in the $k^{th}$ column in the Y direction is $$\Delta Y_k = S(x_k) \qquad (3)$$

Alternate rows of figures are staggered by $\Delta x = S_{min}/2$. This is to insure that the circular figures pack together at the high figure density end of the substrate. The constants a and b in the expression for $S(x_k)$ above are given by $$a = \frac{x_{max} S_{max}^2}{S_{max}^2 - S_{min}^2} \text{ and } b = S_{min}(a)^{\frac{1}{2}} \quad (4)$$

The transmission T(x) (opaque figures) at any value of x is $$T(x) \approx 1 - \frac{(a-x)}{b^2} \cdot \pi \left(\frac{d}{2}\right)^2 \quad (5)$$

where d = circular figure diameter.

Figure 3:
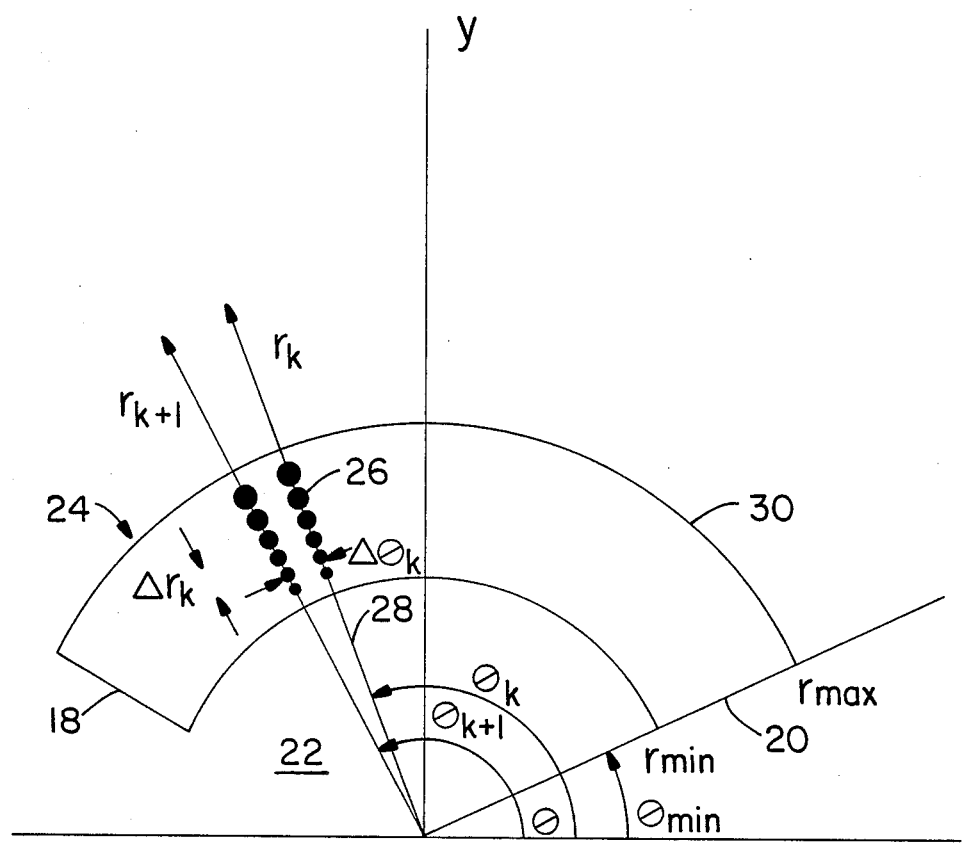
FIG. 3 is a graph showing the transformation of figure locations into polar coordinates for positioning circular figures on the substrate of a light transmission filter having an arcuate configuration.

The algorithm for spacing the FIGS. 16 for rectilinear substrate 14 is used to form the pattern, and may be converted to polar coordinates to produce the spacing for an arcuate substrate such as shown in FIG. 3. The coordinates of each circular figure in the linear coordinate system of FIG. 1 and 2 are transformed into polar coordinates, as shown in FIG. 3, using $r = y + r_{min}$ and $\phi = x/r_{min} + \phi_{min}$. This gives an angular spacing between $k^{th}$ and $k+1^{th}$ radius vectors of $\Delta\theta_k = S(x_k)/r_{min}$, and spacing along the $r^{th}$ radius vector of $\Delta r_k = S(x_k)$.

In the embodiment of the invention of FIG. 3, the circular figure area may be scaled with the radius to enable a continuous, linear attenuation of light. The varying figure diameter in the embodiment of FIG. 3 is given by $$d(r) = d_{min} + \delta(r - r_{min}) \text{ where } \delta = \frac{d_{max} - d_{min}}{r_{max} - r_{min}} \quad (7)$$

Thus the diameters of the circular FIGS. 26 increase moving outward along a radial vector 28 of the arc to compensate for the increase in figure spacing along an outer edge 30 of substrate 24 that occurs when the substrate is converted to polar coordinates. This will enable filter 22 to achieve linear attenuation even if the illumination is non-uniform.

Referring to the embodiment shown in FIG. 4(a), a filter 32 is shown having substrate 34 of rectilinear configuration, figures 36 are rectangular and are of uniform dimension, and selectively spaced throughout the longitudinal dimension of substrate 34 for providing a light transmission characteristic of filter 32 such that a first end 38 of the rectilinear substrate 34 has a minimum figure density and a second end 40 has a maximum figure density. The light transmission characteristic along the rectilinear substrate 34 varies from a minimum transmission of light at second end 40 to a maximum transmission of light at first end 38. The transmission characteristic varies as a selected function of the longitudinal direction along rectilinear substrate 34.

The line spacing S(x) is determined by the algorithm:

$$S(x) = \frac{S_{min}}{1 - \frac{x}{x_{max}} \cdot \frac{(S_{max} - S_{min})}{S_{max}}} \quad (8)$$

and transmission (opaque figures) at any value of x is $$T(x) = 1 + \frac{t}{S_{min}} \left[ \frac{x(S_{max} - S_{min})}{x_{max} S_{max}} - 1 \right] \quad (9)$$

Figure 4B:
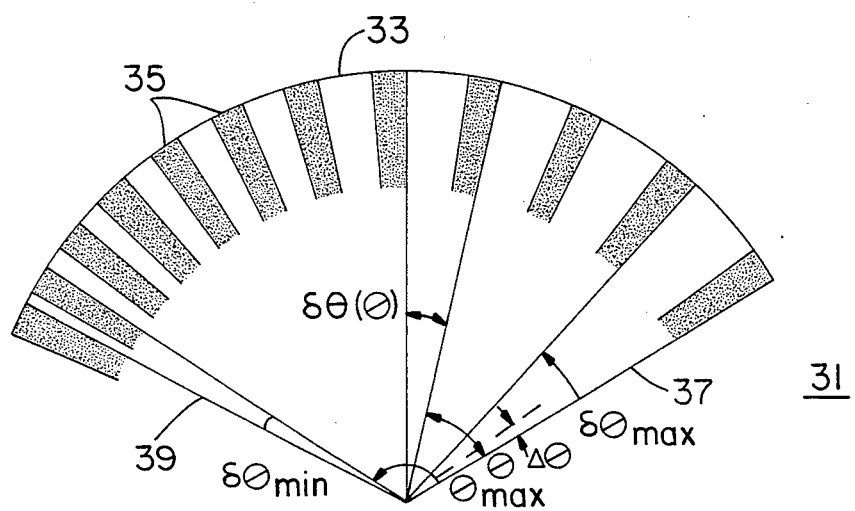
FIG. 4(b) is a schematic plan view illustrating rectangular figure positions in a light transmission filter having an arcuate configuration.

Referring to the embodiment shown in FIG. 4(b), a filter 31 is shown having a substrate 33 of arcuate configuration, FIGS. 35 are rectangular and are of uniform dimension, and selectively spaced throughout the angular dimension of substrate 33 for providing a light transmission characteristic of filter 31 such that a first end 37 of the arcuate substrate 33 has a minimum figure density and a second end 39 has a maximum figure density. The light transmission characteristic along the arcuate substrate 33 varies from a minimum transmission of light at second end 39 to a maximum transmission of light at first end 37. The transmission characteristic varies as a selected function of the angular direction along arcuate substrate 33.

The line spacing $\delta\theta(\theta)$ is determined by the algorithm:

$$\delta\theta(\theta) = \frac{\delta\theta_{min}}{1 - \frac{\theta}{\theta_{max}} \cdot \frac{(\delta\theta_{max} - \delta\theta_{min})}{\delta\theta_{max}}} \quad (10)$$

and transmission (opaque figures) at any value of $\theta$ is:

$$T(\theta) = 1 - \frac{\Delta\theta}{\delta\theta_{min}} \left[ 1 - \frac{\theta}{\theta_{max}} \cdot \frac{(\delta\theta_{max} - \delta\theta_{min})}{\theta_{max}} \right] \quad (11)$$

Referring to FIGS. 5(a) and 5(b) which illustrate still another embodiment of the invention, a filter 42 has a substrate 44 with a plurality of spaced elongated FIGS. 46 forming a hyperbolic pattern. The spaced elongated FIGS. 46 are comprised of hyperbolic lines having thickness "t" on rectilinear substrate 44. Substrate 44 can also be of arcuate configuration in accordance with the invention. Line thickness "t" is constant in the direction of the arrow y, and for any given value of x of FIG. 5(a), the spacings between the axes of lines 46 is constant as shown by S(x) in FIG. 5(b). To a good approximation, the intercepted areas between each line 46 and a vertical strip width x will be equal. The transmission T(x) (opaque figures) at any value of x is therefore $$T(x) = 1 + \frac{t}{S_{min}} \left[ \frac{x(S_{max} - S_{min})}{x_{max} S_{max}} - 1 \right] \quad (12)$$

and the line spacing is $$S(x) = \frac{S_{min}}{1 - \frac{x}{x_{max}} \cdot \frac{(S_{max} - S_{min})}{S_{max}}} \quad (13)$$

The equation for the axis of each line is as follows.

Center Line — Straight Line $y = 0$

1st Line above or below $y = 0$ 
$$y = \pm \frac{S_{min}}{1 - \frac{x(S_{max} - S_{min})}{x_{max} S_{max}}} \quad (14)$$

2nd Line above or below $y = 0$ 
$$y = \pm \frac{2S_{min}}{1 - \frac{x(S_{max} - S_{min})}{x_{max} S_{max}}} \quad (15)$$

nth Line above or below $y = 0$ 
$$y = \pm \frac{nS_{min}}{1 - \frac{x(S_{max} - S_{min})}{x_{max} S_{max}}} \quad (16)$$

Figure 6:
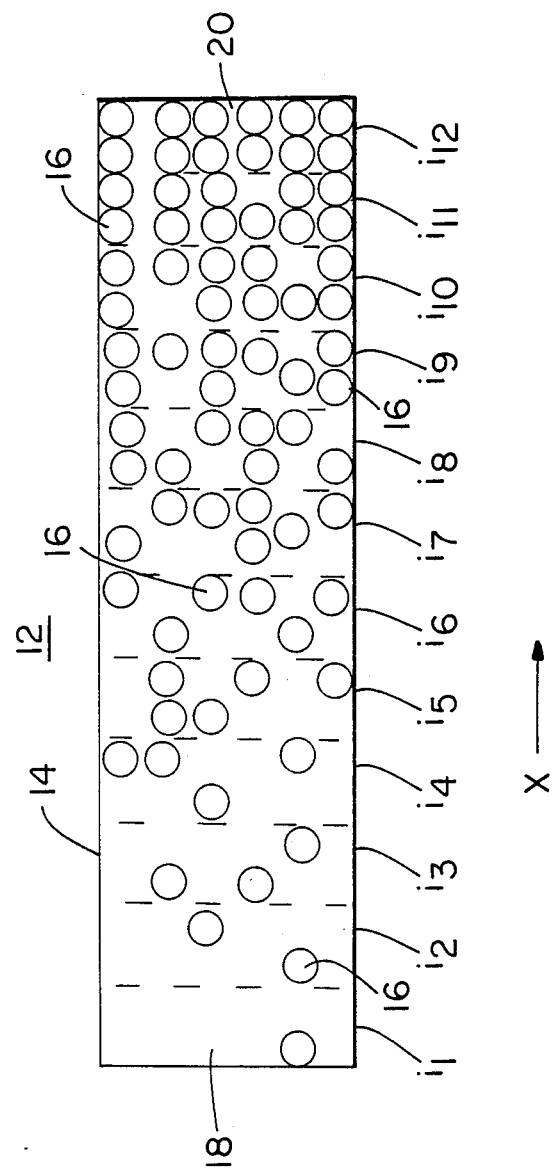
FIG. 6 is a highly magnified schematic plan view illustrating circular figures disposed laterally along a linear path on a light transmission filter in accordance with the present invention.

As shown in FIG. 6, substrate 14 may be divided into a series of longitudinal increments of equal dimension $i_1$ through $i_{12}$ throughout the longitudinal length of the substrate 14. Substrate 14 can also be of arcuate configuration in accordance with the invention. A single circular FIG. 16 may be located randomly in longitudinal increment $i_1$, two may be located randomly in $i_2$, three FIGS. 16 in $i_3$, etc. until the final increment $i_{12}$ is completely filled with circular FIGS. 16. The lateral positioning of figures inside each increment is controlled so that no overlap of figures occurs. The embodiment shown in FIG. 6 will produce a linear light transmission characteristic in accordance with longitudinal direction along the substrate; however, the number of FIGS. 16 in each increment $i_1$-$i_{12}$ may be "weighted" to produce a light transmission characteristic along substrate 14 having almost any algebraic relationship.

In accordance with the present invention there is provided an optical analog sensing apparatus for determining the position of a movable member in a prescribed path. The apparatus comprises a member mounted to move in a prescribed path, a substrate having a first light transmission characteristic and a pattern of spaced figures having a second light transmission characteristic disposed on the substrate. The pattern of spaced figures has one dimension configured to correspond to the prescribed path and the pattern of figures is selectively dimensioned, configured and spaced on the substrate for providing an overall light transmission characteristic that varies in the direction of at least one dimension of the pattern.

Figure 7A:
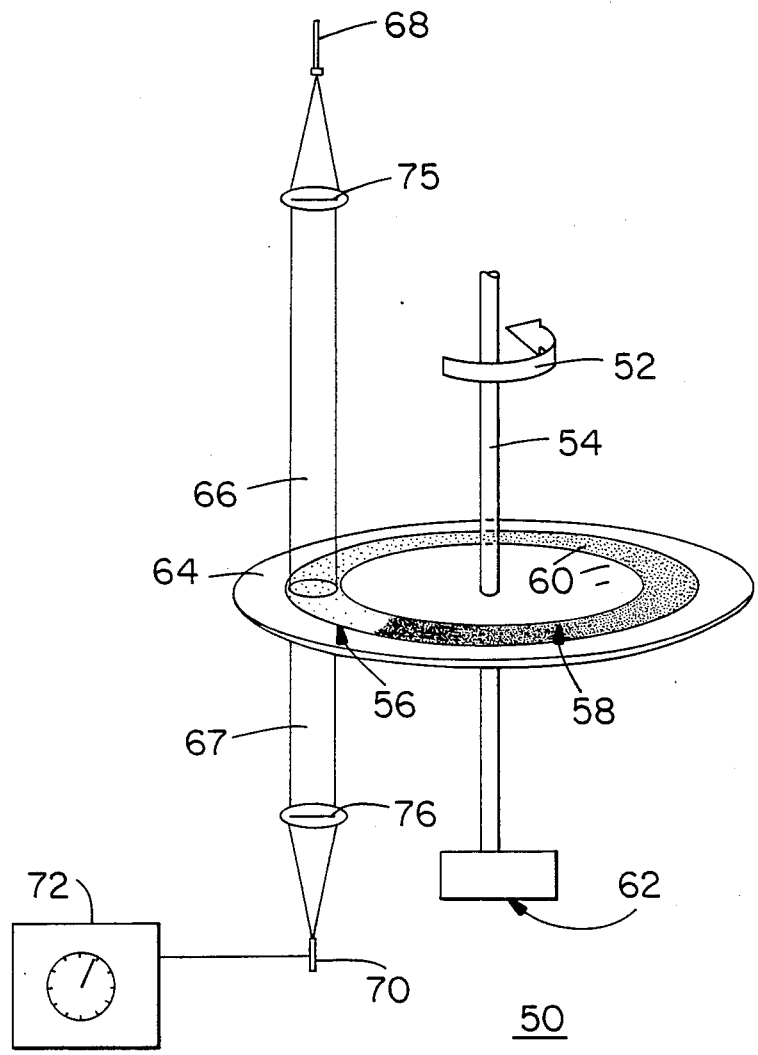
FIG. 7(a) is a schematic diagram of an optical analog sensing apparatus utilizing the light transmission filter according to one embodiment of the present invention.

As embodied herein and referring to FIG. 7(a), an optical analog position sensing apparatus 50 is provided for determining the angular position of shaft 54 shown by arrow 52. In accordance with the invention, the apparatus includes a shaft such as 54 mounted to move in a prescribed path and a pattern of spaced FIGS. 60 disposed on a substrate 56, the FIGS. 60 having light transmitting characteristics differing from the light transmitting characteristics of the substrate 56.

Annular substrate 56 has an annular pattern 58 of circular FIGS. 60 as embodied herein, which are of uniform size in this embodiment and have a variable spacing in the angular direction. The invention further includes means for causing the substrate 56 or a beam of light 66 directed at the substrate 56 to move relative to the other throughout the prescribed path and means for detecting the intensity of the filtered beam 67 for indicating the position of a movable member 62 in the prescribed path. In the embodiment illustrated by FIG. 7a, the beam of light 66 is stationary and the substrate 56 is caused to move by the movable member 62.

In accordance with the invention, shaft 54 is mounted to be rotated by a movable member 62 fixed to one end of the shaft. A disc shaped transparent resolver plate 64 is attached to, and rotatable with the shaft 54. Annular pattern 58 is concentrically disposed on resolver plate 64, and has a diameter substantially greater than shaft 54. A beam of light 66, which emanates from a fixed light source 68 is transmitted through the pattern 58 of FIGS. 60 to strike a detector 70. A meter or other suitable indicator 72 registers the angular rotation of movable member 62 about shaft 54 in accordance with the intensity of attenuated beam 67. The movable member 62 may be, for example, a flap on the wing of an airplane with the axis of the airplane flap being the shaft 54. Thus the shaft 54 rotates as the axis of the airplane flap rotates. This rotation of the shaft 54 will cause the resolver plate 64 and attached substrates 56 to rotate. As the substrate 56 is caused to rotate, the beam of light 66 is variably attenuated by the variable pattern of spaced FIGS. 60 on the substrate 56. The intensity of the attenuated beam of light 67 transmitted through the substrate 56 is measured by detector 70 and indicated by meter 72. This will accurately indicate the angular position of movable member 62.

In accordance with the invention, annular substrate 56 is positioned on resolver plate 64 to completely intercept beam of light 66. Annular substrate 56 has a length dimension with opposite ends representative of the limits of the position of the shaft 54. The substrate 56 illustrated in FIG. 7a extends in a complete 360° circle; in practice an angular rotation only approaching 360° could be sensed. For some applications, such as the airplane flap, it may be necessary to have an arcuate filter such as filter 22 of FIG. 3 which forms a portion of a circle.

Light source 68 as embodied herein can be any standard optical source transmitted through an optical fiber, however other sources could be used such as a light emitting diode or an incandescent lamp. A collimating lens 75 receives the light from light source 68 and transmits beam 66 of a selected size. Focusing lens 76 receives the attenuated beam of light 67 and transmits it to optical detector 70. Optical detector 70 preferably is an optical fiber coupled to a detector but other detectors could be used such as a pin diode. Light source 68 and optical detector 70 may also transmit and detect light directly to and from resolver plate 64, i.e., not via optical fibers. In actual operation, additional optical elements including fiberoptic cables and interconnects may be located between light source 68 and optical detector 70.

Figure 7B:
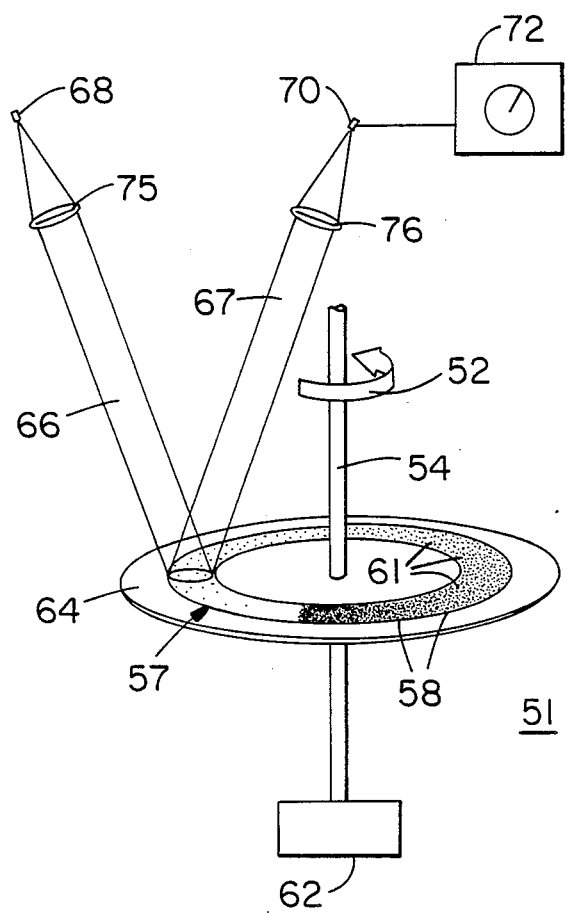
FIG. 7(b) is a schematic diagram of an optical analog sensing apparatus utilizing the light transmission filter according to another embodiment of the present invention.

As embodied herein and referring to FIG. 7(b), an analog position sensing apparatus is illustrated which is similar to the apparatus illustrated in FIG. 7(a). In this embodiment, the apparatus 51 may include a substrate 57 which may be reflective with FIGS. 61 opaque or transparent, or may include FIGS. 61 which may be reflective with substrate 57 opaque or transparent. Beam of light 66 is reflected from resolver plate 64 by either FIGS. 61 or substrate 57, the reflected beam of light 67 is detected by detector 70 and the angular position of movable member 62 is indicated at meter 72.

Figure 8A:
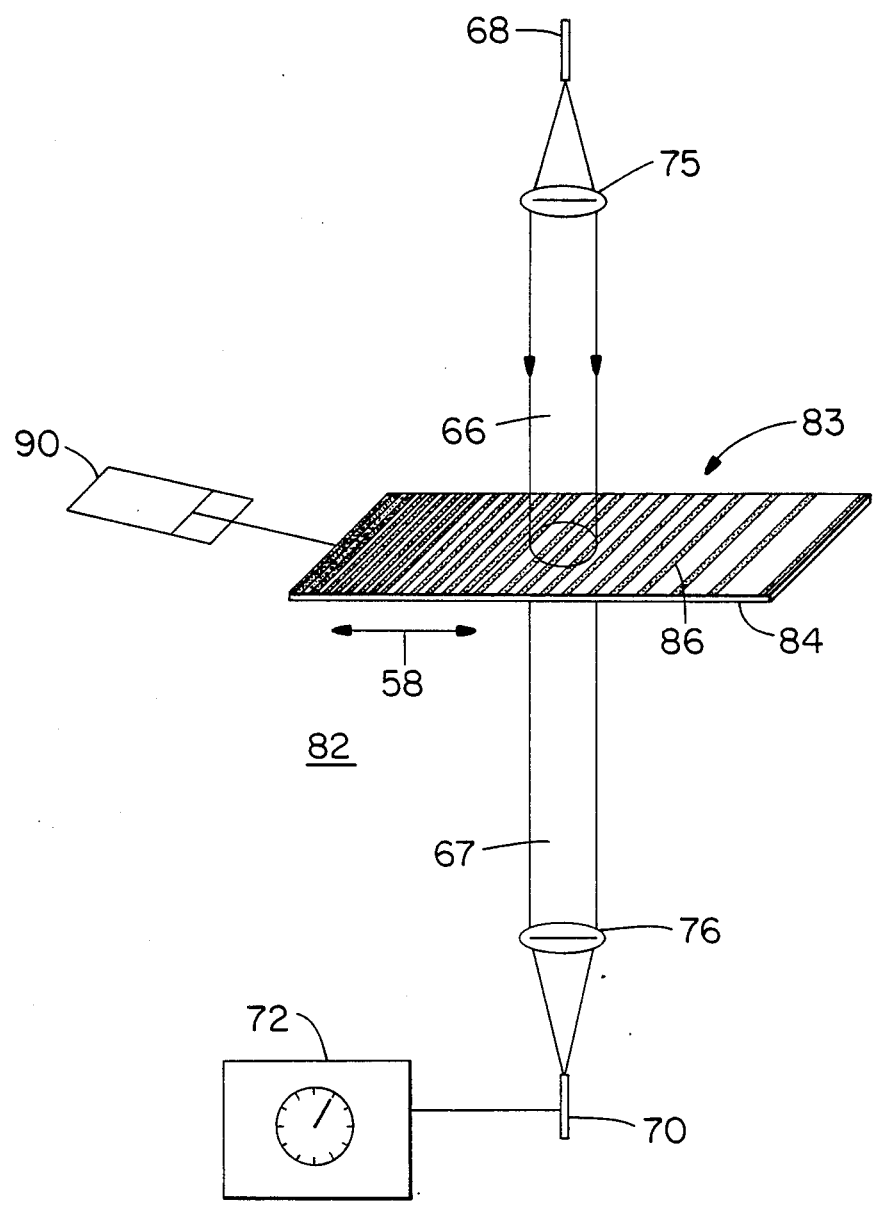
FIG. 8(a) is a schematic diagram of an optical analog sensing apparatus utilizing a light transmission filter according to a third embodiment of the present invention.

As embodied herein and referring to FIG. 8(a), an analog position sensing apparatus 82 is illustrated which determines the longitudinal position of a movable member 90. The apparatus 82 includes a resolver 83 composed of rectilinear substrate 84 having a pattern of spaced FIGS. 86 disposed thereon. FIG. 86 are rectangular resolver 83 in configuration with the spacing between figures varying in the longitudinal direction indicated by arrow 88. Substrate 84 attaches to a movable member 90 which can be, for example, a hydraulic piston attached to a vertical or horizontal stabilizer on an airplane. The movement of the stabilizer will cause the movement of the resolver 83. The movement of resolver 83 relative to the beam of light 66 will cause the light intercepted to be variably attenuated by the longitudinally variable pattern of spaced FIGS. 86 positioned along substrate 84. The intensity of the attenuated beam of light 67 transmitted through the substrate 84 is detected by detector 70 and the longitudinal position of movable member 90 is indicated at meter 72.

Figure 8B:
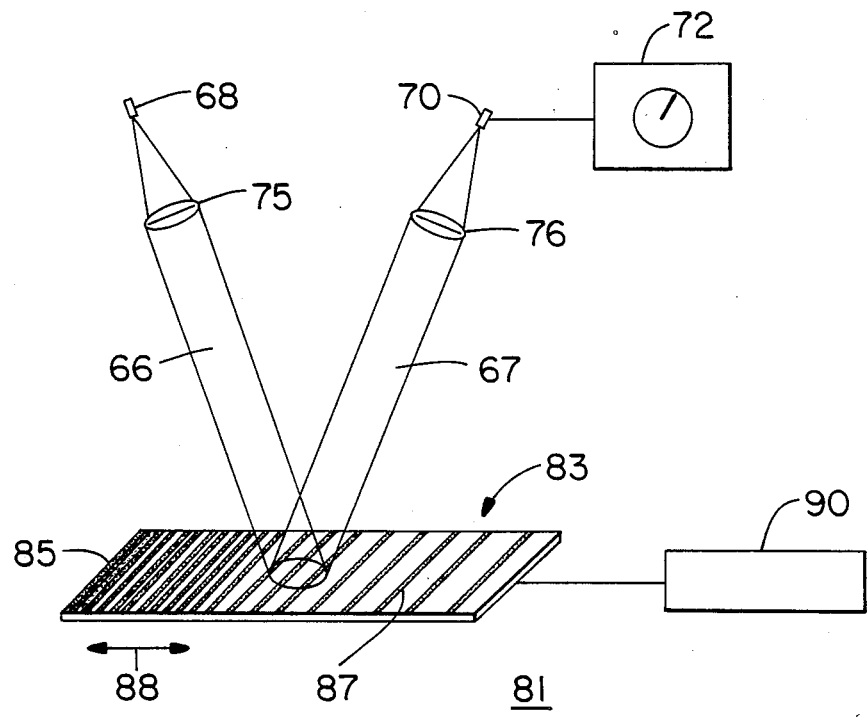
FIG. 8(b) is a schematic diagram of an optical analog sensing apparatus utilizing a light transmission filter according to a fourth embodiment of the present invention.

As embodied herein and referring to FIG. 8(b), an analog position sensing apparatus 81 is illustrated which is similar to the apparatus illustrated in FIG. 8(a). In this embodiment, substrate 85 may be reflective and FIGS. 87 opaque or transparent or FIGS. 87 may be reflective and substrate 85 opaque or transparent. Beam of light 66 is reflected from resolver 83 by either FIGS. 87 or substrate 85, the reflected beam of light 67 is detected by detector 70 and the longitudinal position of movable member 90 is indicated at meter 72.

All of the embodiments of the position sensor as disclosed herein describe a substrate mounted on a movable member with a stationary beam of light shining therethrough. However, it is within the scope of the present invention for the beam of light to be mounted to the movable member with the substrate being fixed in a stationary position.

In order to achieve accurate, continuous attenuation by the function desired, it is necessary that the beam of light defined by the condensing lens be large relative to the size of the figures. As the size of the beam of light transmitted increases relative to the size of the figures, the light transmitted varies with position by a function which approaches a continuous function. The number of figures within the beam of light determines the "noise" level of "granularity" of the sensing apparatus. Noise or granularity is a term for the deviation from the intended function of the transmission of the beam. FIG. 9 shows the theoretical sensor error expected in the FIG. 7(a) embodiment of the position sensing apparatus as a function of the ratio of the beam of light diameter to circular figure diameter. Percent error, or deviation from continuity (y axis), is plotted as shown by line 100 as a function of beam diameter/figure diameter (x axis). Maintaining a maximum beam diameter/figure diameter ratio will minimize error in the present invention.

Figure 10:
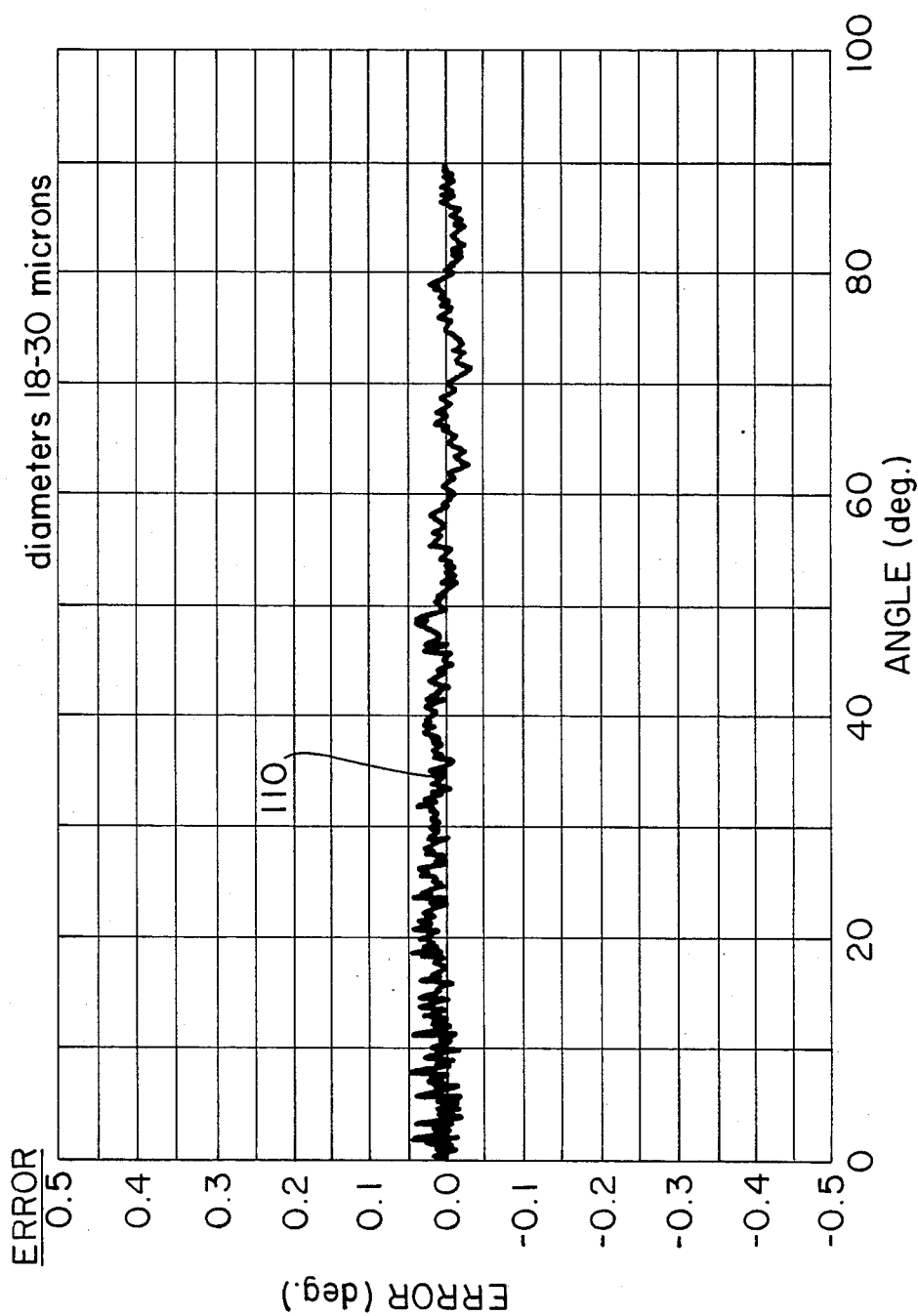
FIG. 10 is a graph showing theoretical error in degrees for an optical analog sensing apparatus for detecting angular position of a rotatable shaft in accordance with the present invention.

In accordance with the invention, FIG. 10 is a graph showing the theoretical error or deviation from the intended function in degrees that can be expected in the embodiment shown in FIG. 7(a) of the optical analog position sensor having a beam of light with a diameter of 4 millimeters and circular figure diameters between 18 and 30 microns. The error in degrees along the y axis is plotted versus the angle of rotation of the movable member shown by the x axis and is illustrated by line 110. It can be seen from FIG. 10 that the maximum theoretical error for this position sensor having a beam diameter of 4 mm and a circular figure diameter of 18–30 microns will be no greater than ±0.05 degrees.

Referring to FIG. 11, experimental results are shown with the FIG. 7(a) embodiment of the position sensor that was reduced to practice utilizing a beam diameter of 4 millimeters and circular figures having diameters ranging between 18 and 30 microns. In order to prevent "noise" occurring as a result of non-uniformity of illumination across the beam of light, the diameters of the circular figures were varied along a radial vector of the annular substrate. As discussed earlier, this is to insure that uniform transmission of light is achieved along the radial direction of the annular substrate so that non-uniform illumination across the beam of light won't effect linearity. In the example illustrated in FIG. 11, the annular substrate was divided into three radially spaced equal dimensioned annular portions. The figure diameter in the inside annular portion was 18 microns, the figure diameter in the middle annular portion was 24 microns and the figure diameter along the outside annular portion was 30 microns. In FIG. 11, indicated displacement measured by the position sensor is plotted along the y axis versus actual member displacement plotted along the x axis, and is shown by lines 120. Error in degrees of displacement is also shown by line 122. This error represents deviation between the angle of displacement of a movable member measured by the optical analog position sensor of the present invention and the true angle of displacement of a movable member according to one reduction to practice. It can be seen that the error shown by 122, or deviation from linearity achieved by the position sensor of the present invention is approximately 0.1 or 0.2 degrees of displacement. Even for relatively small angles of displacement, this represents a significant improvement over light transmission filters of the prior art many of which have linearity errors approximating 5%.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of applicant's general inventive concept.

What is claimed is:

1. A light transmission filter comprising:
a substrate having a selected configuration and having a first light transmission characteristic;
a pattern of spaced figures disposed on said substrate, said figures having a second light transmission characteristic;
said figures having selected dimensions, configurations and spacing relatively to at least one dimension of said substrate for providing an overall light transmission characteristic that varies in accordance with a selected mathematical function in a selected direction relative to at least one dimension of said substrate.

2. The filter of claim 1, wherein each of said spaced figures is opaque to light and said substrate is transparent to light.

3. The filter of claim 3, wherein either said substrate or said figures is reflective to light.

4. The filter of claim 1, wherein said figures are selectively variably dimensioned and have a selected uniform spacing.

5. The filter of claim 1, wherein said figures are selectively variably spaced and have a selected uniform dimension.

6. The filter of claim 5, wherein said pattern of spaced figures is of arcuate configuration, said figures having selected dimensions, configurations and spacing for providing a light transmission characteristic that varies angularly along the arc of said pattern.

7. The filter of claim 5, wherein said pattern of spaced figures is of rectilinear configuration, said figures having selected dimensions, configurations and spacing for providing a light transmission characteristic that varies longitudinally along said substrate.

8. The filter of claim 7, wherein each of said figures is circular or polygonal in configuration.

9. The filter of claim 8, wherein said figures are spaced according to the equation:

$$S(x_k) = \frac{b}{(a - x_k)^{\frac{1}{2}}}$$

where $S(x_k)$ equals the distance between the spaced figures at $x_k$, $x_k$ equals the distance along the length of said substrate from the point of minimum attenuation, and a and b are constants with $$a = \frac{x_{max} S_{max}^2}{S_{max}^2 - S_{min}^2} \text{ and } b = S_{min}(a)^{\frac{1}{2}}$$ (5)

where $x_{max}$ equals the length of said substrate, $S_{max}$ equals the maximum distance between figures and $S_{min}$ equals the minimum distance between figures.

10. The filter of claim 6, wherein each of said figures is circular or polygonal in configuration.

11. The filter of claim 1, wherein said figures are circular or polygonal, said pattern is rectilinear or arcuate and said figures are randomly spaced laterally or angularly within increments of equal dimension throughout the one dimension of said substrate, each subsequent increment containing a predetermined number of figures greater than the immediately preceding increment.

12. The filter of claim 7, wherein said figures are rectangular or hyperbolic in configuration.

13. The filter of claim 12, wherein said figures are spaced according to the equation:

$$S_{(x)} = \frac{S_{min}}{1 - \frac{x}{x_{max}} \cdot \frac{(S_{max} - S_{min})}{S_{max}}}$$ (8)

where $S_{(x)}$ equals the distance between figures at x, x equals the longitudinal distance along said substrate, $x_{max}$ equals the length of said substrate, $S_{max}$ equals the maximum distance between figures and $S_{min}$ equals the minimum distance between figures.

14. The filter of claim 6, wherein said figures are rectangular in configuration.

15. The filter of claim 14, wherein said figures are spaced according to the equation:

$$\delta\theta(\theta) = \frac{\delta\theta_{min}}{1 - \frac{\theta}{\theta_{max}} \cdot \frac{(\delta\theta_{max} - \delta\theta_{min})}{\delta\theta_{max}}}$$

where $\delta\theta(\theta)$ equals the angular distance between said spaced figures at $\theta$, $\theta$ equals the angle along the arc of said substrate, $\theta_{max}$ equals the angular length of said substrate, $\delta\theta_{max}$ equals the maximum angular distance between said spaced figures and $\delta\theta$ min equals the minimum angular distance between said spaced figures.

16. An optical analog sensing apparatus for determining the position of a movable member in a prescribed path comprising:
a member mounted to move in a prescribed path;
a substrate having a first light transmission characteristic;
a pattern of spaced figures disposed on said substrate having a second light transmission characteristic, said pattern having one dimension configured to correspond to a prescribed path, and said pattern of figures having selected dimensions, configurations and spacing on said substrate for providing a combined light transmission characteristic that varies in accordance with a selected mathematical function in the direction of the one dimension of the pattern;
means for causing one of either the substrate or a beam of light directed at the substrate to move relative to the other throughout the prescribed path, and
means for detecting the intensity of the filtered beam for determining the position of the movable member in the prescribed path.

17. The apparatus of claim 16 wherein said means for transmitting a beam of light is an optical fiber coupled with a light source.

18. The apparatus of claim 16 wherein said means for detecting the intensity of the filtered light is an optical fiber coupled to a detector.

19. The apparatus of claim 16, wherein said pattern is rectilinear in configuration, said figures are rectangular, circular or polygonal in configuration and said prescribed path is linear.

20. The apparatus of claim 19, wherein one of said light transmission characteristics is transparent and one is opaque.

21. The apparatus of claim 19, wherein one of said light transmission characteristics is reflective and one is transparent or opaque.

22. The apparatus of claim 16, wherein said movable member is attached to a cylindrical shaft, said pattern is arcuate in configuration, said figures are circular or polygonal in configuration and said prescribed path is an arc.

23. The apparatus of claim 22, wherein one of said light transmission characteristics is transparent and one is opaque.

24. The apparatus of claim 22, wherein one of said light transmission characteristics is reflective and one is transparent or opaque.

25. The apparatus of claim 16, wherein the means for causing the beam of light and pattern to move relative to one another includes means for fixedly mounting the beam of light and means for fixedly attaching the substrate to the movable member for moving the pattern in the prescribed path.

26. The apparatus of claim 25, wherein said means for fixedly attaching the substrate to the movable member includes means for attaching said movable member to a shaft rotatably mounted on said means and a resolver plate, said resolver plate having a central axis and a planar surface coaxially attached to said shaft and rotatable therewith, the planar surface of said resolver plate extending substantially perpendicular to the axis of said shaft, said resolver plate including said substrate attached to and disposed coplanar therewith.

* * * * *

UNITED STATES PATENT AND TRADEMARK OFFICE
CERTIFICATE OF CORRECTION

PATENT NO.   :   4,928,008

DATED        :   May 22, 1990

INVENTOR(S)  :   Huggins et al.

It is certified that error appears in the above-identified patent and that said Letters Patent is hereby corrected as shown below:

Claim 1, col. 10, line 31, replace "relatively" with --relative--.

Signed and Sealed this

First Day of October, 1991

Attest:

Attesting Officer

HARRY F. MANBECK, JR.

Commissioner of Patents and Trademarks